United States Patent
Sohn et al.

(10) Patent No.: US 7,817,707 B2
(45) Date of Patent: Oct. 19, 2010

(54) APPARATUS AND METHOD FOR GENERATING RANGING PSEUDO NOISE CODE

(75) Inventors: Kyung-Yeol Sohn, Daejeon (KR); Chang-Wahn Yu, Daejeon (KR); Youn-Ok Park, Daejeon (KR)

(73) Assignees: Samsung Electronics Co., Ltd. (KR); Electronics and Telecommunications Research Institute (KR); KT Corporation (KR); SK Telecom Co., Ltd. (KR); KTFreetel Co., Ltd. (KR); Hanaro Telecom., Inc. (KR)

( * ) Notice: Subject to any disclaimer, the term of this patent is extended or adjusted under 35 U.S.C. 154(b) by 738 days.

(21) Appl. No.: 11/791,055

(22) PCT Filed: Nov. 11, 2005

(86) PCT No.: PCT/KR2005/003835

§ 371 (c)(1),
(2), (4) Date: May 18, 2007

(87) PCT Pub. No.: WO2006/054848

PCT Pub. Date: May 26, 2006

(65) Prior Publication Data

US 2008/0170632 A1     Jul. 17, 2008

(30) Foreign Application Priority Data

Nov. 18, 2004   (KR) .................... 10-2004-0094536

(51) Int. Cl.
*H04B 1/69* (2006.01)
*H04B 1/707* (2006.01)
*H04B 1/713* (2006.01)

(52) U.S. Cl. .................. 375/140; 375/146; 375/147; 375/149; 708/250; 708/252; 708/256

(58) Field of Classification Search .......... 375/140, 375/146, 147, 145, 149, 260; 708/250, 252, 708/253, 255, 256; 370/208, 335, 342
See application file for complete search history.

(56) References Cited

U.S. PATENT DOCUMENTS

| 5,532,695 | A | 7/1996 | Park et al. |
| 6,339,781 | B1 | 1/2002 | Sasaki |
| 6,556,555 | B1 | 4/2003 | Miller et al. |
| 6,798,736 | B1 * | 9/2004 | Black et al. ................. 370/208 |
| 2003/0198179 | A1 | 10/2003 | Koo et al. |

FOREIGN PATENT DOCUMENTS

| KR | 1020020084915 | 11/2002 |
| KR | 1020020094108 | 12/2002 |

* cited by examiner

*Primary Examiner*—Phuong Phu
(74) *Attorney, Agent, or Firm*—The Farrell Law Firm, LLP

(57) ABSTRACT

Disclosed is an apparatus for generating a ranging pseudo noise (PN) code used in a base station of a portable internet system of an orthogonal frequency division multiplexing access scheme, wherein a ranging pseudo noise mask value is generated using a cell ID number, and then the generated ranging pseudo noise mask value is stored in a memory. A final ranging PN code is generated using the stored ranging PN mask value and a status of a pseudo random binary sequence for generating a ranging PN code. With such a structure, the maximal 256-numbered ranging PN code values can be obtained simultaneously with each 144 bit-length.

8 Claims, 5 Drawing Sheets

[Fig. 1]
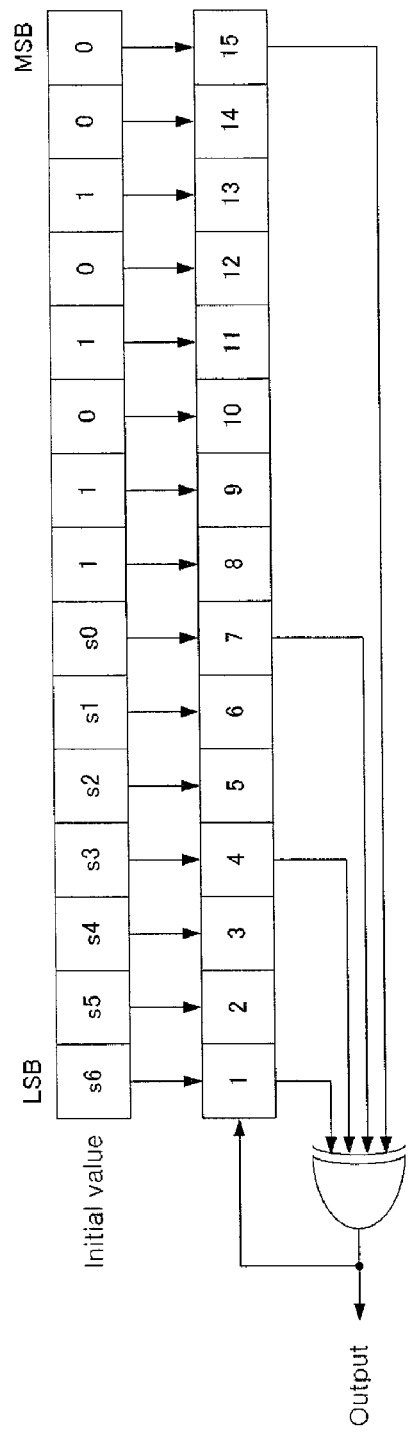
(PRIOR ART)

[Fig. 2]
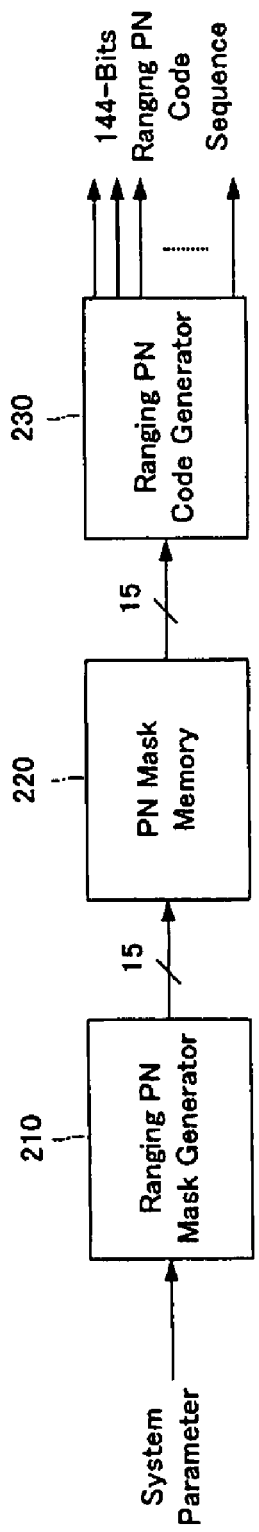

[Fig. 3]
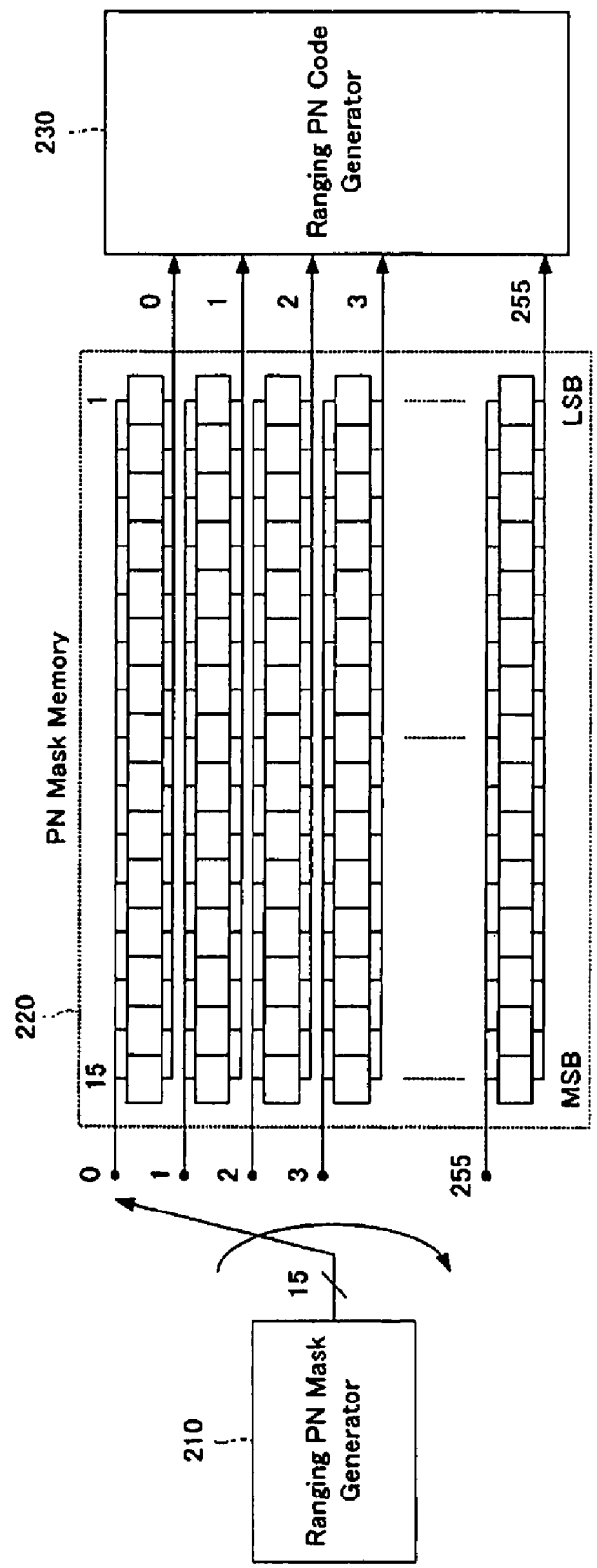

[Fig. 4]
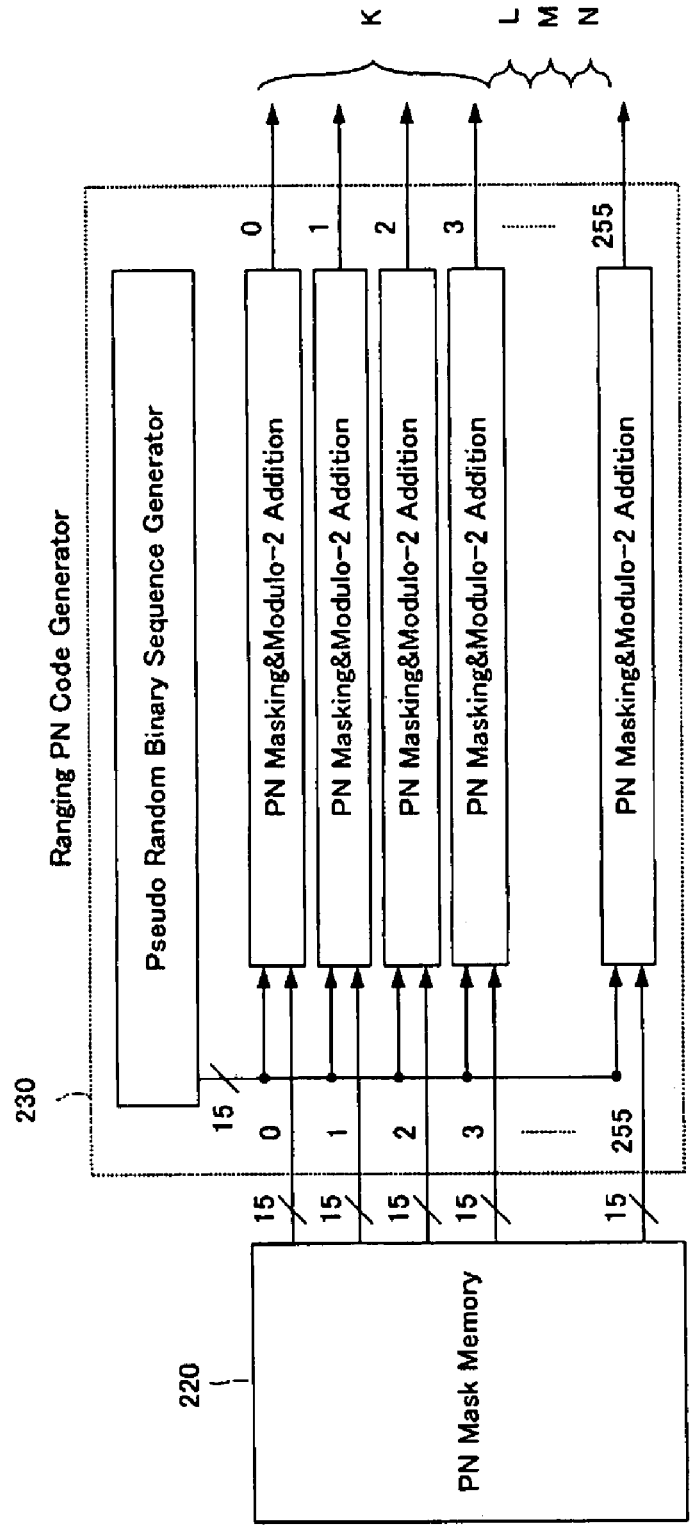

[Fig. 5]
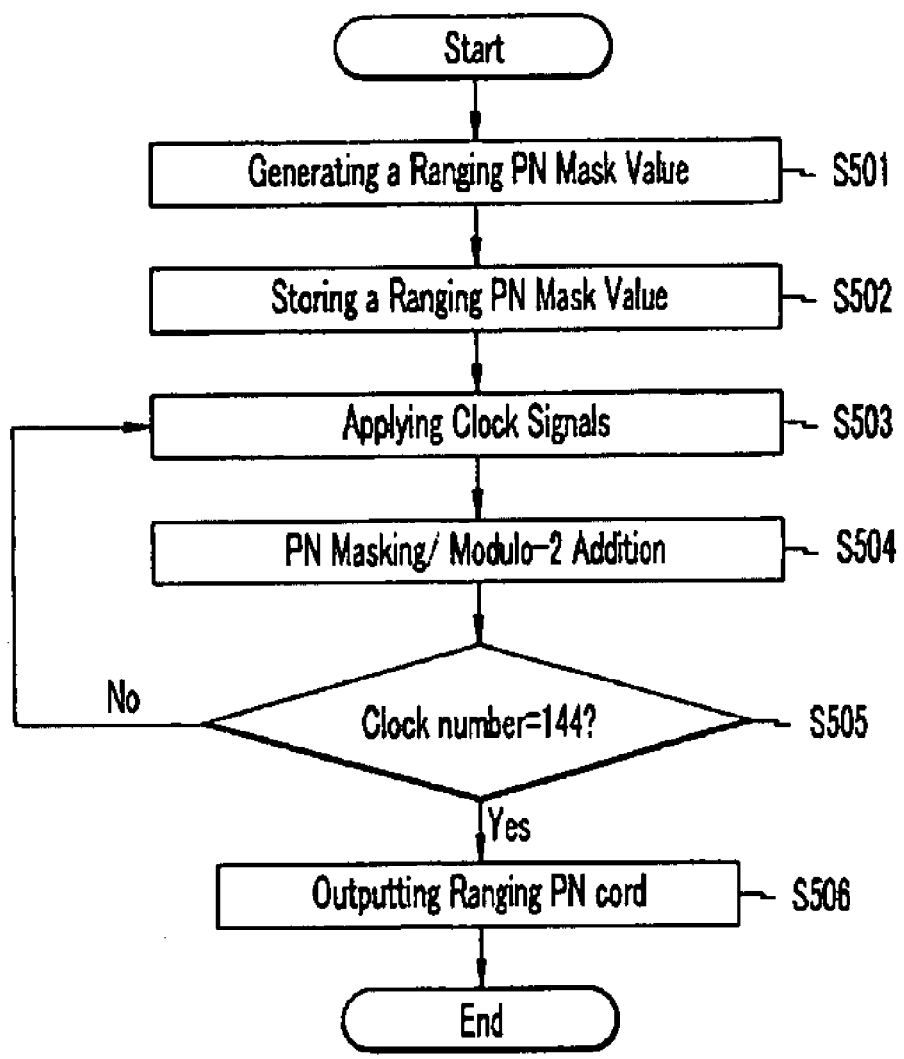

APPARATUS AND METHOD FOR GENERATING RANGING PSEUDO NOISE CODE

TECHNICAL FIELD

The present invention relates to a wireless portable Internet system, and more particularly, to an apparatus for generating a ranging pseudo noise code (hereinafter called a PN code) used in a base station of a wireless portable Internet system of an orthogonal frequency division multiple access (OFDMA) scheme.

BACKGROUND ART

Typically, for a physical layer of a portable internet system of an OFDMA scheme four ranging modes are defined, such as an initial ranging, a periodic ranging, a hand-off ranging, and a bandwidth request ranging. The bandwidth request ranging mode is used for a terminal to request a bandwidth to a base station, and the other ranging modes are used for power control and an uplink synchronization acquisition between the terminal and the base station.

Meanwhile, the ranging PN code used for a portable internet system of an OFDMA scheme is generated by a characteristic polynomial as shown in equation 1, and the number of ranging PN code symbols available in each ranging mode is determined at the time of establishing an initial system.

$$G(x) = x^{15} + x^7 + x^4 + x + 1 \quad \text{(Equation 1)}$$

The ranging PN code generator applies different initialization codes for different cells using cell ID numbers, which are expressed as a combination of "00101011" and 7 bits (i.e., [s6:s0]).

For example, for the 144-bit-long ranging PN code, 256 ranging PN codes in total may be used for all the ranging modes, and such ranging PN codes may be generated as follows.

First, one long sequence generated through first to $(144*(K \bmod 256))$-th clock outputs of the ranging PN code generator are equally divided into K number of 144-bit-long codes, and they are used as symbols for the initial ranging mode.

Another long sequence is generated through $(144*(K \bmod 256)+1)$-th to $(144*((K+L) \bmod 256))$-th clock outputs of the ranging PN code generator and it is equally divided into L number of 144-bit-long codes for usage as symbols for the hand-off ranging mode.

In addition, a further long sequence is generated through $(144*((K+L) \bmod 256)+1)$-th to $(144*((K+L+M) \bmod 256))$-th clock outputs of the ranging PN code generator and it is equally divided into M number of 144-bit-long codes for usage as symbols for the periodic ranging mode.

Finally, another long sequence is generated through $(144*((K+L+M) \bmod 256)+1)$-th to $(144*((K+L+M+N) \bmod 256))$-th clock outputs of the ranging PN code generator and it is equally divided into N number of 144-bit-long codes for usage as symbols for the bandwidth request ranging mode.

FIG. 1 illustrates a schematic diagram of an apparatus for generating a ranging PN code used for a wireless portable Internet system of an SSRG scheme.

As shown in FIG. 1, a ranging PN code generator having an initial value of [0, 0, 1, 0, 1, 0, 1, 1, s0, s1, s2, s3, s4, s5, s6] generates K, L, M, and N numbered PN codes for respective usage as symbols for the initial ranging, the periodic ranging, the hand-off ranging, and the bandwidth request ranging through receiving the maximum $(144*((K+L+M+N) \bmod 256)$-th clock signals and equally dividing the output PN code into 144-bit-long codes. Therefore, the ranging PN code generator shows a drawback of consuming a significant amount of time to produce codes appropriate for all ranging modes and requires a maximum $(144*256)$-bit memory to store the pre-produced codes.

Also, because the terminal may transmit all of the above-noted four ranging modes (initial ranging mode, periodic ranging mode, hand-off ranging mode, and bandwidth request ranging mode) to the base station, the ranging PN code generator should process the maximum 256 numbered ranging PN codes simultaneously according to the setting system parameter on receiving the PN codes of the four ranging modes from the terminal.

The above information disclosed in this Background section is only for enhancement of understanding of the background of the invention and therefore, it may contain information that does not form the prior art that is already known in this country to a person or ordinary skill in the art.

DISCLOSURE OF INVENTION

Technical Problem

The present invention has been made in an effort to provide an apparatus and method for generating a ranging pseudo noise (PN) code having advantages of obtaining the maximal 256-numbered ranging PN code values simultaneously for a 144 bit-ranging mode.

Technical Solution

The apparatus for generating a ranging pseudo noise (PN) code is used in a base station of a portable internet system of an orthogonal frequency division multiplexing access scheme.

The apparatus for generating a ranging pseudo noise (PN) code includes a ranging PN mask generator for generating a PN mask value using a cell ID number, determined at the time of establishing an initial system, and a system parameter, a PN mask memory for storing the ranging PN mask value produced from the ranging PN mask generator, and a ranging pseudo noise code generator for generating a ranging PN code using the ranging PN mask value sent from the PN mask memory and a status value of a Pseudo Random Binary Sequence (PRBS).

The ranging pseudo noise code generator includes a pseudo random binary sequence generator for generating the pseudo random binary sequence value, and a plurality of PN masking/modulo-2 addition units connected in parallel for performing a PN masking and modulo-2 addition for the pseudo random binary sequence value obtained from the PRBS generator and the mask value output from the PN mask memory to generate the ranging PN code.

The pseudo random binary sequence generator may have a constant initial value.

In another embodiment, a method for generating a ranging pseudo noise code is used in a base station of a portable internet system of an orthogonal frequency division multiplexing access scheme.

The method for generating a ranging pseudo noise code includes generating a pseudo noise mask value using a system parameter and a cell ID number, determined at the time of establishing an initial system, storing the ranging PN mask value and generating a final ranging PN code by means of performing masking and modulo-2 additions for the ranging PN mask value and pseudo random binary sequence value.

The pseudo random binary sequence value may be generated using a constant initial value.

On receiving 144 numbered clock signals, the maximal 256-numbered ranging PN code values may be generated simultaneously for the 144 bit-ranging mode.

Advantageous Effects

With such a structure, the maximal 256-numbered ranging PN code values can be obtained simultaneously for the 144-bit ranging mode simply by means of applying 144 numbered clock signals.

BRIEF DESCRIPTION OF THE DRAWINGS

FIG. 1 is a schematic diagram of an apparatus for generating a ranging PN code used for a portable internet system of an SSRG (Simple Shift Register Generator) scheme.

FIG. 2 is a block diagram of an apparatus for generating a ranging PN code used in a base station of a portable internet system according to an embodiment of the present invention.

FIG. 3 is a schematic diagram of a ranging PN mask memory according to an exemplary embodiment of the present invention.

FIG. 4 is a block diagram of a ranging PN code generator according to an embodiment of the present invention.

FIG. 5 is a flowchart showing a process for generating ranging PN code according to an embodiment of the present invention.

MODE FOR THE INVENTION

Preferred embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Firstly, a ranging PN code generator according to an embodiment of the present invention will be described in detail with reference to FIG. 2. The ranging PN code generator is used in a base station of a portable internet system of an OFDMA scheme.

FIG. 2 is a block diagram of an apparatus for generating a ranging PN code used in a base station of a portable internet system according to an embodiment of the present invention.

As shown in FIG. 2, the apparatus for generating a ranging PN code includes a ranging PN mask generator 210, PN mask memory 220, and a ranging PN code generator 230.

The ranging PN mask generator 210 generates a PN mask value using a cell ID number, determined at the time of establishing an initial system, and a system parameter, such as K, L, M, and N allocated according to a ranging mode. The PN mask memory 220 stores the ranging PN mask value produced from the ranging PN mask generator 210. The ranging PN code generator 230 generates a ranging PN code through masking and performing modulo-2 addition for a status value of a Pseudo Random Binary Sequence (PRBS) and the ranging PN mask value stored in the PN mask memory 220.

Operation and structure of an apparatus for generating a ranging PN code of a base station according to an exemplary embodiment of the present invention will be described in detail with reference to FIG. 3 and FIG. 4.

FIG. 3 is a schematic diagram of a ranging PN mask memory according to an exemplary embodiment of the present invention.

As shown in FIG. 3, the ranging PN mask memory 220 stores a 15-bit ranging PN mask value output from the ranging PN mask generator 210 and sends the stored mask value to the ranging PN code generator 230. Also, the ranging PN mask memory 220 stores the maximum 256-numbered ranging PN masks, which are respectively in the form of 15 bits.

FIG. 4 is a block diagram of a ranging PN code generator according to an embodiment of the present invention.

As shown in FIG. 4, the ranging PN code generator 230 according to an exemplary embodiment of the present invention includes a PRBS generator 231 and a plurality of 256-numbered PN masking/modulo-2 addition units 232 connected in parallel.

The PRBS generator 231 may use the above described Equation 1 in the case of an SSRG scheme and the following Equation 2 in the case of an MSRG (Modulo Shift Register Generator) scheme.

$$F(x)=x^{15}+x^{14}+x^{11}+x^{8}+1 \quad \text{(Equation 2)}$$

Also, the PRBS generator 231 allows different PN mask values to be input into the plurality of PN masking/modulo-2 addition units 232 according to the scheme thereof. masking In other words, so as to obtain the ranging PN codes corresponding to K, L, M, and N numbered offsets given as a system parameter at the base station according to the four ranging modes, the PRBS generator 231, having a constant initial value, receives 144-numbered clock signals, and the plurality of PN masking/modulo-2 addition units 232 perform a PN masking and modulo-2 addition for 15-bit status values obtained from the PRBS generator 231 at every receipt of a clock signal and for 15-bit mask values output from the PN mask memory 220, and generates simultaneously the maximal 256-numbered ranging PN codes.

FIG. 5 is a flowchart showing a process for generating a ranging PN code according to an embodiment of the present invention.

As shown in FIG. 5, firstly, the ranging PN mask generator 210 generates a PN mask value using a cell ID number, determined at the time of establishing an initial system, and a system parameter such as K, L, M, and N allocated according to a ranging mode (S501).

Next, the PN mask memory 220 stores the ranging PN mask value produced from the ranging PN mask generator 210 and sends the stored ranging PN mask value to the PN masking/modulo-2 addition units 232 of the ranging PN code generator 230 (S502).

Finally, the PRBS generator 231 having a constant initial value receives 144-numbered clock signals, performs PN masking and modulo-2 addition for 15-bit state values obtained at every receipt of a clock signal and for 15-bit mask values output from the PN mask memory 220 (S503-S505) and outputs simultaneously the maximal 256-numbered ranging PN code results (S506).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for generating a ranging pseudo noise (PN) code in a base station of a portable internet system of an Orthogonal Frequency Division Multiple Access (OFDMA) scheme, the apparatus comprising:
   a ranging PN mask generator for generating a PN mask value using a cell ID number, determined at the time of establishing an initial system, and a system parameter;
   a PN mask memory for storing the ranging PN mask value produced from the ranging PN mask generator;
   a ranging pseudo noise code generator for generating a ranging PN code using the ranging PN mask value transmitted from the PN mask memory and a status value of a Pseudo Random Binary Sequence (PRBS),
   wherein the system parameter is allocated according to a ranging mode, and the ranging mode includes an initial ranging mode, a periodic ranging mode, a hand-off ranging mode, and a bandwidth request ranging mode.

2. The apparatus for generating a ranging pseudo noise code of claim 1, wherein the PN mask memory comprises a plurality of 15-bit memory units and stores the maximal 256-numbered ranging PN mask values.

3. The apparatus for generating a ranging pseudo noise code of claim 1, wherein the ranging PN code generator comprises:
   a pseudo random binary sequence generator for generating the pseudo random binary sequence value; and
   a plurality of PN masking/modulo-2 addition units connected in parallel for performing a PN masking and modulo-2 addition for the pseudo random binary sequence value obtained from the PRBS generator and the mask value output from the PN mask memory to generate the ranging PN code.

4. The apparatus for generating a ranging pseudo noise code of claim 3, wherein the pseudo random binary sequence generator has a constant initial value.

5. The apparatus for generating a ranging pseudo noise code of claim 3, wherein the ranging pseudo noise code generator receives 144 numbered clock signals, and the masking/addition units generate simultaneously the maximal 256-numbered ranging PN codes according to 144 bit-ranging mode using the ranging pseudo noise mask value and the status value obtained from the PRBS generator at every receipt of a clock signal.

6. The apparatus for generating a ranging pseudo noise code of claim 3, wherein the ranging pseudo noise code generator is in the form of a simple shift register generator or a modulo shift register generator, and the ranging pseudo noise code generator inputs different ranging pseudo noise mask values into the masking/addition units according to the form of the ranging pseudo noise code generator.

7. A method for generating a ranging pseudo noise code of a portable internet system of an Orthogonal Frequency Division Multiple Access (OFDMA) scheme, the method comprising:
   generating a pseudo noise mask value using a system parameter and a cell ID number determined at the time of establishing an initial system;
   storing the ranging PN mask value; and
   generating a final ranging PN code by means of performing masking and modulo-2 additions for the ranging PN mask value and a pseudo random binary sequence value,
   wherein the system parameter is allocated according to a ranging mode, and the ranging mode includes an initial ranging mode, a periodic ranging mode, a hand-off ranging mode, and a bandwidth request ranging mode.

8. The method for generating a ranging pseudo noise code of claim 7, wherein the pseudo random binary sequence value is generated using a constant initial value, and on receiving 144 numbered clock signals, the maximal 256-numbered ranging PN code values are generated simultaneously for a 144 bit-ranging mode.

* * * * *